US00RE39739E

(19) United States
(12) Reissued Patent
Iguchi et al.

(10) Patent Number: US RE39,739 E
(45) Date of Reissued Patent: Jul. 24, 2007

(54) GLASS BULB FOR COLOR PICTURE TUBE AND THE SAME TUBE

(75) Inventors: Yukinobu Iguchi, Kanagawa (JP); Ichiro Utsumi, Kanagawa (JP); Koji Saita, Kanagawa (JP)

(73) Assignee: Sony Corporation (JP)

(21) Appl. No.: 10/050,537

(22) Filed: Jan. 18, 2002

Related U.S. Patent Documents

Reissue of:
(64) Patent No.: 6,016,028
Issued: Jan. 18, 2000
Appl. No.: 08/914,118
Filed: Aug. 19, 1997

(30) Foreign Application Priority Data

Aug. 23, 1996 (JP) ..... 8-241364

(51) Int. Cl.
*H01J 29/80* (2006.01)
*H01J 29/10* (2006.01)
*H01J 31/00* (2006.01)
*H01J 61/30* (2006.01)

(52) U.S. Cl. ..... 313/402; 313/407; 313/408; 313/461; 313/477 R; 313/479; 220/2.1 A

(58) Field of Classification Search ..... 313/402–408, 313/461, 466, 473, 474, 477 R, 478, 479; 220/2.1 A, 2.3 A, 2.1 R, 2.3 R
See application file for complete search history.

(56) References Cited

U.S. PATENT DOCUMENTS 3,873,868 A * 3/1975 Robinder ..... 313/110
4,537,322 A * 8/1985 Okada et al. ..... 313/477 R
4,570,101 A * 2/1986 Campbell
4,777,401 A * 10/1988 Hosokoshi et al.

(Continued)

FOREIGN PATENT DOCUMENTS

EP 0239083 A2 * 9/1987
EP 0281379 A2 * 9/1988
EP 0612094 A1 * 8/1994
EP 0 626 717 A1 11/1994

(Continued)

OTHER PUBLICATIONS

RCA Picture Tubes, 1980 RCA Corporation, pp. 45–49, "Contoured–line Screens for New In–Line Color Picture Tubes."

Notice of Patent Opposition dated Jun. 19, 2000, by Taiko Tohyama, filed in Japanese Patent Office against corresponding Japanese Patent No. 2,993,437.

Notice of Patent Opposition dated Jun. 19, 2000, by Teruo Itoh, filed in Japanese Patent Office against corresponding Japanese Patent No. 2,993,437.

Notice of Reasons for Cancellation dated Nov. 21, 2000, by Trial Examiner of Japanese Patent Office, for corresponding Japanese Patent No. 2,993,437.

Official Decision on Opposition to Grant of Patent dated May 18, 2001, by Japanese Patent Office, for corresponding Japanese Patent No. 2,993,437.

EPO Official Action dated Nov. 4, 2002.

*Primary Examiner*—Joseph Williams
(74) *Attorney, Agent, or Firm*—Rader Fishman & Grauer PLLC; Ronald P. Kananen

(57) ABSTRACT

A color picture tube is provided with a glass bulb in which the external surface of the effective display area of the face plate is formed substantially flat and a color selection mask, having the curvature projected toward the face plate, provided opposed to the internal surface of the face plate within the glass bulb. Therefore, the external surface is flat, the mechanical shock resistance characteristic is high, a tension can surely be applied to the color selection mask and moreover vibration of the color selection mask can be prevented even if external vibration is applied thereto.

15 Claims, 4 Drawing Sheets

U.S. PATENT DOCUMENTS

| | | | | | |
|---|---|---|---|---|---|
| 5,151,627 | A | * | 9/1992 | Van Nes et al. | 313/408 X |
| 5,216,321 | A | * | 6/1993 | Kawamura et al. | 313/408 X |
| 5,396,145 | A | * | 3/1995 | Shiohara et al. | 313/402 |
| 5,416,380 | A | | 5/1995 | Horiuchig | 313/407 |
| 5,536,995 | A | * | 7/1996 | Sugawara et al. | |
| 5,552,663 | A | * | 9/1996 | Iida et al. | |
| 5,606,217 | A | * | 2/1997 | Hirai et al. | 313/402 X |

FOREIGN PATENT DOCUMENTS

| | | |
|---|---|---|
| JP | SHO 50-106561 | 8/1975 |
| JP | SHO 51-118956 | 10/1976 |
| JP | SHO 52-43359 | 4/1977 |
| JP | SHO 53-83572 | 7/1978 |
| JP | SHO 61-158651 | 7/1986 |
| JP | SHO 62-213044 | 9/1987 |
| JP | SHO 64-77841 | 3/1989 |
| JP | HEI 2-148544 | 6/1990 |
| JP | HEI 6-36710 | 2/1994 |
| JP | HEI 7-99030 | 4/1995 |
| JP | HEI 7-142012 | 6/1995 |

* cited by examiner

GLASS BULB FOR COLOR PICTURE TUBE AND THE SAME TUBE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates, for example, to a color picture tube of a television receiver for household use, a color picture tube of a computer monitor and color display and a glass bulb for color picture tube used in these color picture tubes.

2. Description of the Related Art

A color picture tube is used in a variety of apparatuses for household use and industrial use such as television color picture tube, computer monitor and color display or the like. In general, a glass bulb forming a color picture tube is formed of a face plate and a funnel and the face plate and funnel are joined with a glass bonding agent. At the internal surface of face plate, light emitting material layer is provided to emit the lights of three colors of red, green and blue. Moreover, a color selection mask is provided opposed to the internal surface of the face plate within the glass bulb.

With enlargement in size of color picture tube, it is requested to use a face plate having a flat surface of a glass bulb in order to satisfy the requirement for distortion-free and more natural display. The color picture tube having such a flat face plate is already known, for example, by the Japanese Patent Application Laid-Open No. HEI 7-99030. The color picture tube disclosed in this Japanese patent application is provided with a bulb including a flat glass panel and a flat shadow mask provided opposed to the flat glass panel in this bulb.

However, in the color picture tube having a flat glass panel disclosed in the Japanese patent application laid-open No. HEI 7-99030, it is difficult to give uniform tension in both horizontal direction (X direction) and vertical direction (Y direction) of the color selection mask and a newly designed facilities which are different from the existing one to a large extend will be required. Moreover, it is also difficult to prevent vibration of color selection mask caused by the vibration applied from external side, easily resulting in a problem of deterioration of display quality due to vibration of the color selection mask. In addition, since the thickness of the flat glass panel is uniform, so-called the arch effect is not provided and strength of the glass panel for external mechanical shock is rather low and it is essential to form a thick glass panel in order to acquire the sufficient strength for explosion. When the glass panel as a whole is formed thick as explained above, not only distortion of image increased due to refraction of light at the glass panel but also weight of the color picture tube as a whole is increased. Here, the arch effect means that when the face plate of the glass bulb is projected toward outside, if a mechanical shock is applied to the frame plate from external side, a compressing force is applied to the internal surface of the face plate and thereby the shock resistance property of the face plate is increased. When an external mechanical shock is applied to the face plate of the flat glass bulb, the face plate may be broken easily because a tensile force is applied to the internal surface of the face plate.

SUMMARY OF THE INVENTION

It is therefore a first object of the present invention to provide a glass bulb for color picture tube having a flat external surface and higher mechanical shock resistance characteristic. Moreover, it is a second object of the present invention to provide a color picture tube which uses a flat external surface and assures higher mechanical shock resistance characteristic and moreover is easily capable of giving stable characteristic to the color selection mask without introduction of a new technology and eliminates vibration of the color selection mask even if external vibration is applied from the external side.

In view of achieving the first object explained above, a glass bulb for color picture tube of the present invention is characterized in that the external surface of the effective display area of the face plate is substantially flat and the peripheral part in the horizontal direction of the effective display area of the face plate is thicker than the central area of the effective display area.

Here, the effective display area of the face plate means the face plate area on which image is actually displayed when the glass bulb for color picture tube is comprised into the color picture tube. Moreover, the fact that the external surface of the effective display area of the face plate is substantially flat means that the area in the manufacturing error tolerance range of face plate is flat. For example, the manufacturing error tolerance range of the face plate in the glass bulb of 28-inch size is about 1 to 2 mm or less. In this case, the surface of the face plate can be visually assumed flat perfectly. Moreover, change in thickness of the effective display area of the face plate toward the peripheral area in the horizontal direction from the center of the effective display area can be expressed using the arcs or polynomial. The curve depicted by the internal surface of the face plate when it is assumed that the glass bulb is held horizontally and the face plate is cut along the vertical surface may be a straight line or may be a curve expressed by arcs or by polynomial. When the thickness of the peripheral area in the horizontal direction of the effective display area of the face plate is assumed as T and thickness of the center area of the effective display area as $T_0$, it is preferable that $T=1.2\ T_0$ to $1.3\ T_0$.

As explained above, the glass bulb for color picture tube of the present invention can realize the flat surface because the external surface of the effective display area of the face plate is substantially flat. Moreover, in regard to the internal surface of the face plate, even if the peripheral area in the horizontal direction of the effective display area is thicker by 20 to 30%(for example, 3 to 5 mm) than the central area, the face plate may visually be assumed flat because the phenomenon that the peripheral area can be seen floated a little by means of the refraction effect. In addition, since the peripheral area in the horizontal direction of the effective display area of the face plate is thicker than the central area of the effective display area, so-called arch effect is generated. Accordingly, the glass panel has higher resistance for external mechanical shock and it is no longer necessary to form a thicker face plate in order to assure higher strength for explosion.

In view of attaining the second object of the present invention explained above, the color picture tube of the present invention is characterized in providing:

(a) glass bulb having the face plate of which external surface of the effective display area is substantially flat; and (b) color selection mask provided opposed to the internal surface of the face plate within the glass bulb to have the curvature of projection toward the face plate.

Here, curvature of color selection mask means the curvature of a curve depicted by cross section of the color selection mask when the color selection mask is assumed to be cut at the horizontal plane. This curve should preferably be an arc and in this case, the curvature of the color selection mask corresponds to an inverse number of the radius of arc. A shadow mask and aperture grill may be listed as a type of the color selection mask.

In the case where the aperture grill type color selection mask is used, the color picture tube is provided with a frame member and it is preferable that the color selection mask is attached to the frame member under the condition that the tension is applied in the vertical direction.

It is not essential but is preferable for realizing higher strength of the face plate that a resin film is bonded at the external surface of the glass bulb for color picture tube or of the face plate of the glass bulb of the color picture tube. In the present invention, since the external surface of the face plate is substantially flat, the resin film may be bonded easily to the external surface of the face plate. The resin film may be bonded to the face plate using, for example, an acrylic pressure sensitive bonding agent. As a resin film, polyethylene, polyethylene terephthalate, polyester and polystylene may be listed. The resin film may also introduce the multi-layer structure. For instance, it is possible to give the conductivity to the resin film in such a degree as sufficient for preventing charging of the face plate by bonding a conductive material such as tin oxide ($SnO_2$) powder to the external or internal surface of the resin film using a bonding agent consisting of silicon oxide or coating the external or internal surface of the resin film with a conductive material such as tin oxide for the purpose of evaporation or sputtering. On the other hand, it is also possible to form a hard film on the external surface of the resin film (surface in the opposite side to the face plate) in order to improve surface hardness. As a hard film, a silicon hard coat may be listed. In other words, the resin film may be colored for controlling the transmissivity of light passing through the face plate and resin film. In addition, it is also possible to form a non-reflection layer or ununiform area at the external surface of the resin film in order to prevent reflection of light incident from external side.

In the color picture tube of the present invention, since a glass bulb in which the external surface of the effective display area of the face plate is substantially flat is used, a color picture tube having the smooth display area can be realized. In addition, since the color selection mask having the curvature projected toward the face plate is provided, when the aperture grill is used, for example, as the color selection mask, it can effectively prevented that the color selection mask is vibrated due to external vibration, because of use of the dumping wire, as is done in the related art. Moreover, since the color selection mask can be attached to the frame member with a sufficient tension, it can also be prevented effectively that color displacement by the doming phenomenon is generated, in which color selection mask is expanded because electron beams collide with the color selection mask. In addition, even in case the shadow mask is used as the color selection mask as well as the aperture grill, it is possible to introduce the structure similar to that of the related art because the shaping of the projected surface is possible.

BRIEF DESCRIPTION OF THE DRAWINGS

Other objects and advantages of the present invention will be apparent from the following detailed description of the presently preferred embodiments thereof, which description should be considered in conjunction with the accompanying drawings in which.

DESCRIPTION OF THE PREFERRED EMBODIMENTS

The preferred embodiments of the invention will be explained with reference to the accompanying drawings.

(Embodiment 1)

Figure 1:
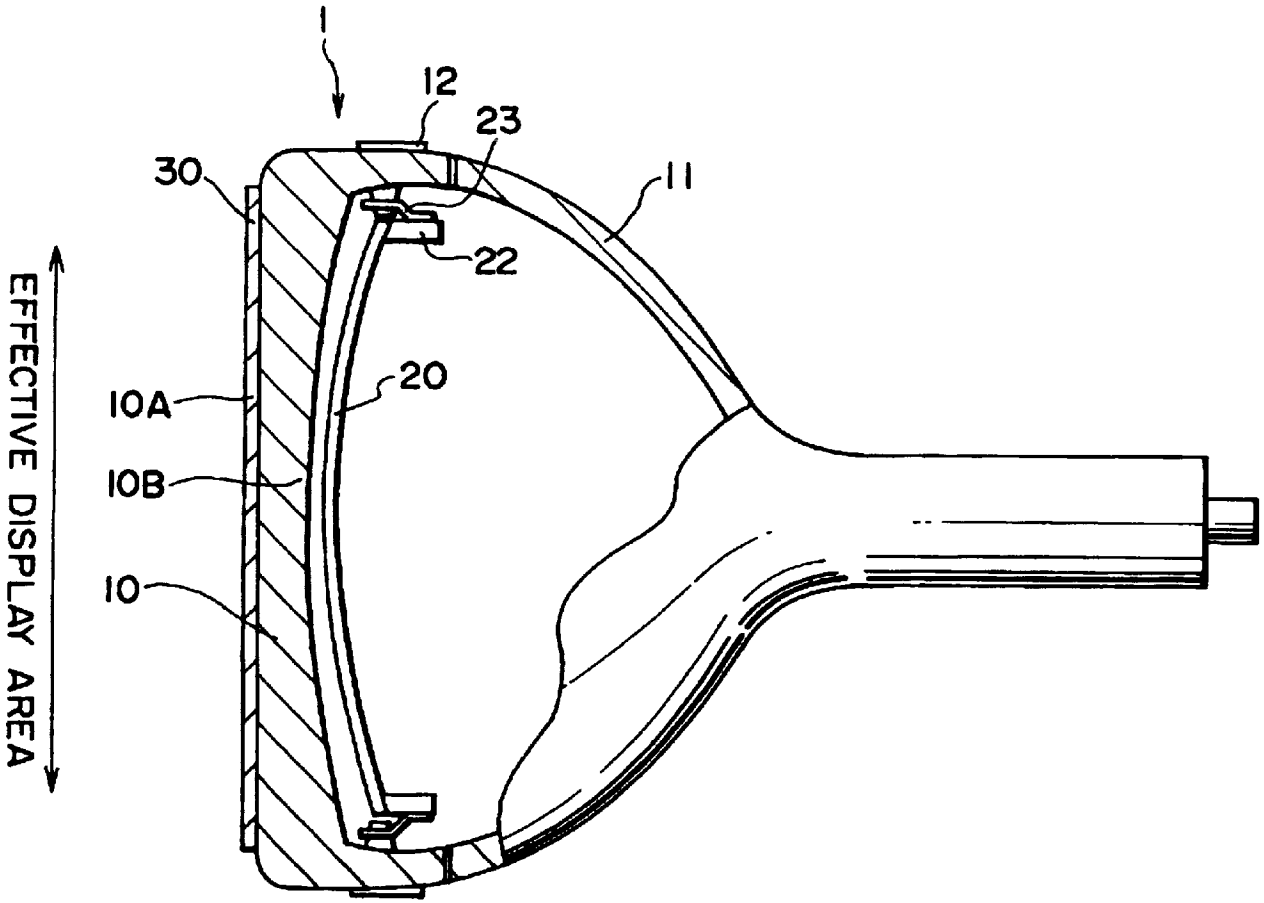
FIG. 1 is a partly cutout schematic diagram of a color picture tube in relation to a first embodiment of the present invention.

FIG. 1 is a schematic diagram of a partly cutout color picture tube of the embodiment 1 of the present invention. The color picture tube of the present invention is provided with a glass bulb 1 in which the external surface 10A of the effective display area of the face plate 10 is substantially flat and a color selection *mechanism in the form of a* mask 20 which is provided, within the glass bulb 1, opposed to the internal surface 10B of the face plate 10 [and is having the]. *The color selection mask 20 has a* curvature projected toward the face plate 10. In regard to the face plate 10 of the embodiment 1, the external surface 10A of the effective display area is substantially flat and thickness T of the peripheral part in the horizontal direction of the effective display area of the faceplate is larger than that $T_0$ of the central area of the effective display area. In other words, the internal surface 10B of the face plate 10 of the glass bulb 1 has the curvature recessed toward the color selection mask 20. The curvature of the color selection mask 20 is larger than the curvature of the internal surface 10B of the face plate 10.

When it is assumed that the glass bulb 1 is held horizontally and the face plate 10 is cut at the horizontal line, the curve depicted by the internal surface 10B of the face plate 10 may be an arc or a curve expressed by a polynomial. When such curve is expressed by an arc, an inverse number of the radius of arc corresponds to the curvature of the internal surface 10B of the face plate 10. Moreover, when such curve is expressed by a polynomial, an inverse number of the radius of the arc connecting the three points of the peripheral area in the horizontal direction of the effective display area of the face plate 10 and the center of the effective display area is defined as the curvature of the internal surface 10B of the face plate 10. In the color picture tube of the preferred embodiment 1, since the curvature of the color selection mask 20 is larger than the curvature of the internal surface 10B of the face plate 10, the distance up to the *color selection mask from the* peripheral area in the horizontal direction of the effective display area of the face plate 10 is longer *than that up to the color selection mask* from the center of the effective display area of the face plate 10 [is longer than that up to the color selection mask]. However, in the color picture tube of the preferred embodiment 1, color purity, particularly, in the peripheral area of the television color picture tube can be remarkably improved by widening the pitch between the apertures 21, 21 ([refere] *refer* to FIG. 4B) provided in the color selection mask 20 as it goes to the peripheral area in the horizontal direction of the face plate 10.

Figure 4A:
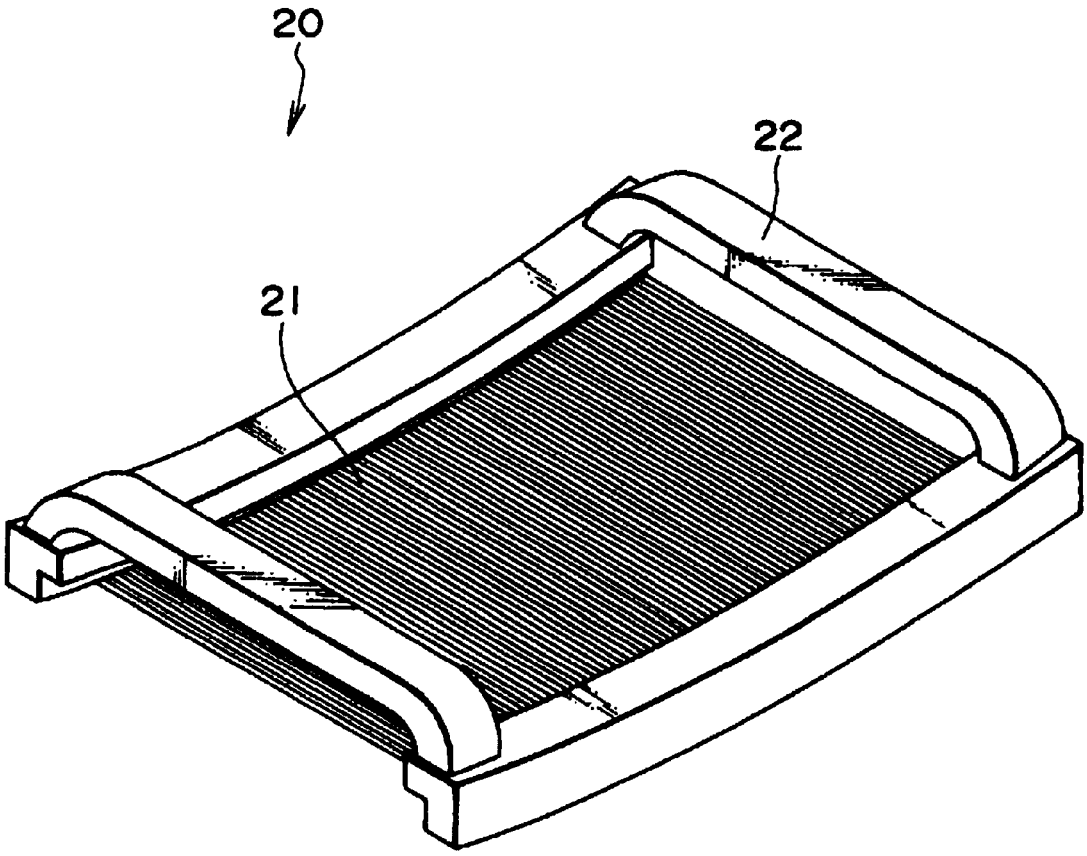
FIG. 4A and FIG. 4B are schematic perspective view of an aperture grill type color selection mask and a partly enlarged schematic diagram of the aperture provided to the color selection mask.
Figure 4B:
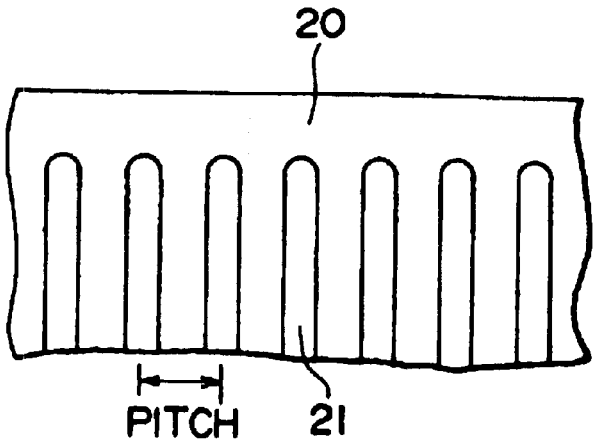

The face plate 10 is bonded with a funnel 11 with a glass bonding agent. The *skirt portion of the* face plate 10 near the funnel 11 is wound by a tension band 12 to enhance the strength of the glass bulb 1. As the schematic perspective view of FIG. 4A shows, the aperture grill type color selection mask 20 [is] *includes a plurality of fine metal leads which are* attached to *and extend over* the frame member 22 by the resistance welding method or laser welding method under the condition that the tension is applied in the vertical direction. *A plurality of apertures 21 are formed between the fine metal leads with a pitch between the apertures as shown in FIG. 4B.* The frame member 22 is removably attached to the face plate 10 with a fitting device 23 formed of spring. The other structure of the color picture tube is similar to that of the existing color picture tube and detail description will be omitted here.

The external surface 10A of the face plate 10 is bonded with a resin film 30 formed of polyethylene terephthalate using a acrylic pressure sensitive bonding agent. This resin film 30 is given a conductivity which is enough, for example, to prevent charging of the face plate and a silicon hard coat film is formed at the external surface of the resin film.

In the 28-inch type color picture tube, when the external surface 10A of the face plate 10 is placed on the surface table so that the surface 10A of the center of the effective display area of the face plate 10 is in contact with the surface table, a gap of about 1 to 2 mm is sometimes generated between the peripheral area in the horizontal direction of the effective display area of the face plate 10 and the surface table, a curving of the external surface 10A of the face plate 10 of such a degree is within the manufacturing error tolerance range of the face plate. The face plate within the manufacturing error tolerance range of such a degree can be seen sufficiently smooth through the human eyes.

In the 28-inch type color picture tube, thickness T of the peripheral area in the horizontal direction of the effective display area of the face plate is set to 18 mm, while thickness $T_0$ at the center of the effective display area to 15 mm. Since the a curve depicted by the internal surface 10B of the face plate 10 is set to an arc, the radius of curvature of the internal surface 10B of the face plate 10 is about 10000 mm. Since the external surface of the face plate is flat, if the internal surface of the face plate is curved in such a degree, the face plate can be seen flat also when an image is displayed. Moreover, the radius of curvature of the color selection mask is set to about 8000 mm. In the preferred embodiment 1, the pitch between the apertures 21, 21 provided in the color selection mask 20 is set to 0.56 mm at the center of the effective display area of the face plate 20 and it is then gradually widened as it goes to the peripheral area in the horizontal direction and it is finally set to 0.8 mm at the peripheral area in the horizontal direction of the effective display area of the face plate 10. Thereby, color purity in the peripheral area of the television color picture tube can be improved to a large extent.

(Embodiment 2)

Figure 2:
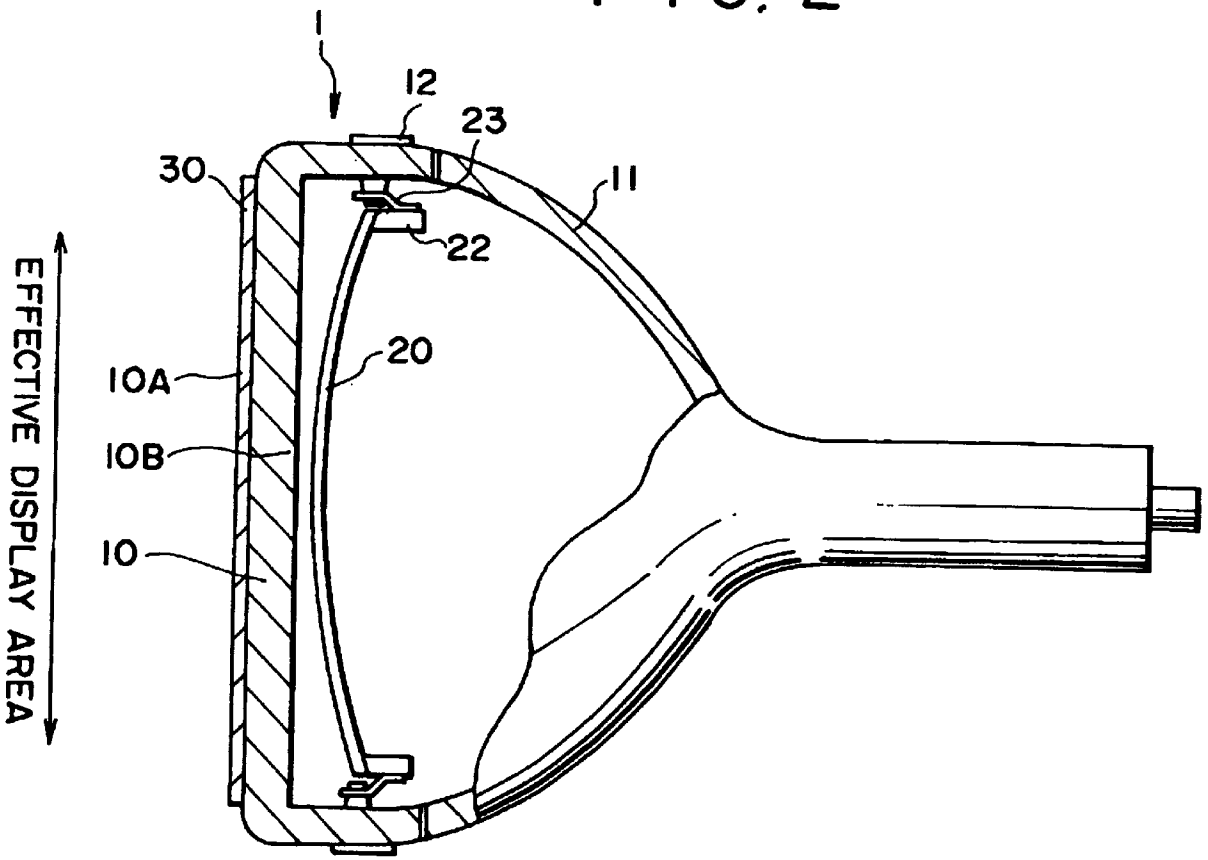
FIG. 2 is a partly cutout schematic diagram of a color picture tube in relation to a second embodiment of the present invention.

In the color picture tube of the embodiment 2, thickness of the face plate 10 in the effective display area is set substantially equal as shown in FIG. 2. Here, the wording "substantially equal" means that thickness is equal within the manufacturing error tolerance range of the face plate. Namely, the internal surface 10B of the face plate 10 is formed substantially flat. Like the embodiment 1, the color selection mask 20 has the curvature projected toward the face plate 10. Also in the color picture tube of the embodiment 2, the pitch between the apertures 21, 21 provided in the color selection mask 20 is gradually widened as it goes toward the peripheral area in the horizontal direction of the face plate 10.

In the color picture tube of the embodiment 2, since the face plate 10 is formed flat, the face plate must be formed thicker than that of the embodiment 1. However, since it is provided with the color selection mask having the curvature projected toward the face plate, vibration of the color selection mask due to external vibration can be prevented effectively generation of color displacement due to the doming phenomenon can also be prevented effectively.

(Embodiment 3)

Figure 3:
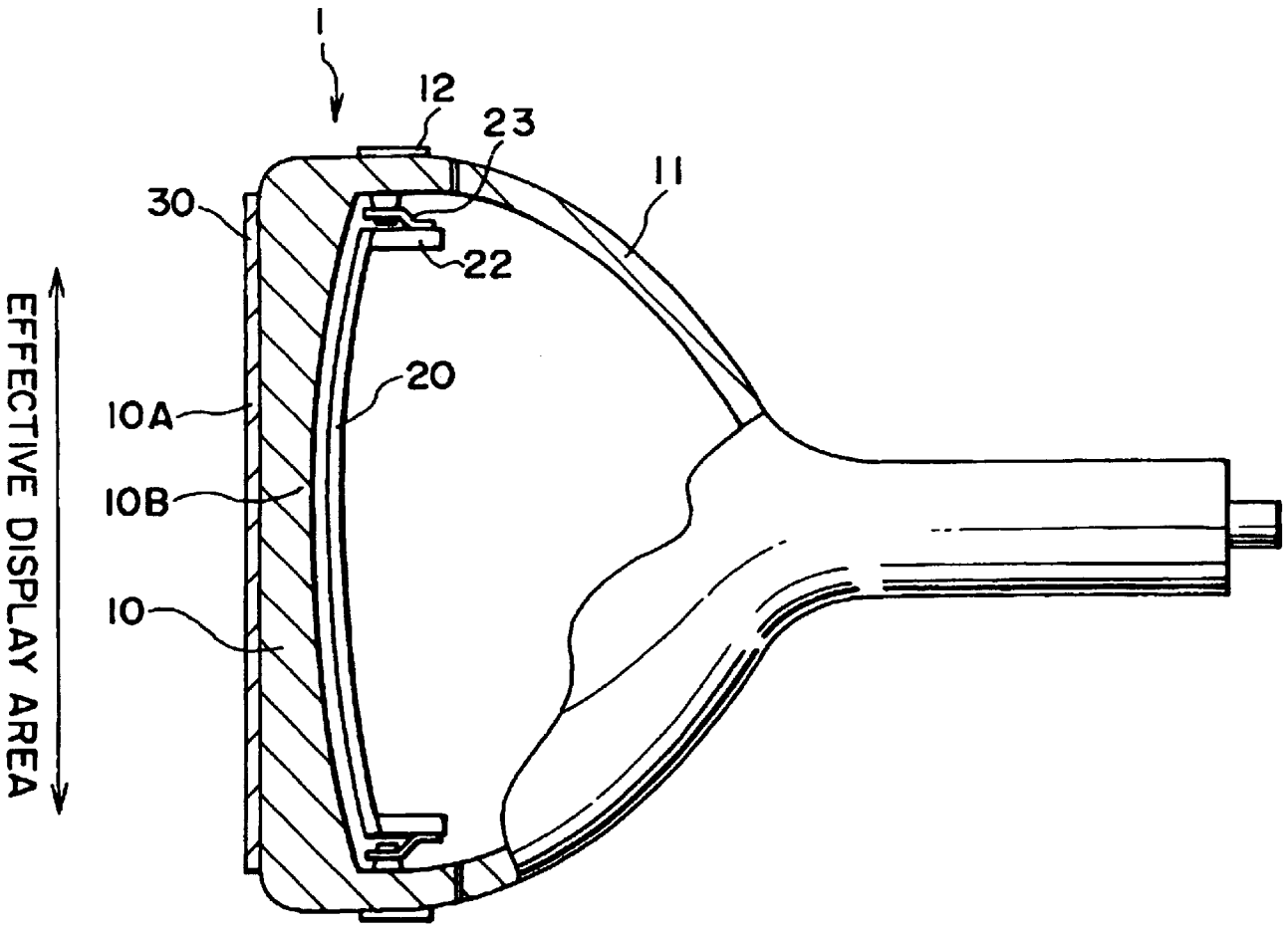
FIG. 3 is a partly cutout schematic diagram of a color picture tube in relation to a third embodiment of the present invention.

In the color picture tube of the embodiment 3, as shown in FIG. 3, the internal surface 10B of the face plate 10 of glass bulb 1 has the curvature projected toward the color selection mask 20 and the curvature of the color selection mask 20 is almost equal to the curvature of the internal surface 10B of the face plate 10. In more practical, the radius of curvature of the color selection mask 20 is within the range from 90% to 100% of the radius of curvature of the internal surface 10B of the face plate 10. In this case, the pitch between the apertures 21, 21 provided in the color selection mask is preferably be set constant without relation to the horizontal position of the face plate 10.

The present invention has been described on the basis of the preferred embodiments of the present invention, but the present invention is not limited thereto. The numerical data given in the above embodiments are only examples and these values may of course be varied and the structure of the color picture tube is also examples.

With introduction of the glass bulb for color picture tube of the present invention, not only a color picture tube having the flat surface can be realized, but also higher mechanical shock resistance characteristic of the glass panel for external shock can be realized and it is no longer required to make thicker the face plate in order to assure the sufficient strength for explosion.

In comparison with the flat type face plate, weight of the face plate can be reduced by about 10% to 20%.

Moreover, while keeping the manufacturing system and quality of the related art, the color picture tube having the flat display surface can be realized by introduction of the color picture tube of the present invention. In addition, since the color selection mask having the curvature projected toward the face plate is provided, not only vibration of color selection mask due to external vibration can be prevented but also generation of color displacement due to the doming effect can also prevented effectively.

What is claimed is:

[1. A cathode ray tube comprising:

a glass bulb in which an external surface of an effective display area of a face plate is substantially flat and a peripheral area in the horizontal direction of the effective display area of the face plate is thicker than a center of the effective display area; and a color selection mechanism having a curvature projected toward the face plate provided opposed to an internal surface of the face plate within the glass bulb.]

[2. A cathode ray tube according to claim 1, wherein the internal surface of the face plate of the glass bulb has a curvature recessed toward the color selection mechanism.]

[3. A cathode ray tube according to claim 1, wherein the curvature of the color selection mechanism is larger than a curvature of the internal surface of the face plate.]

[4. A cathode ray tube according to claim 1, wherein the curvature of the color selection mechanism is almost equal to a curvature of the internal surface of the face plate.]

5. A cathode ray tube according to claim [1] *10*, wherein a multiple layered resin film is bonded to the external surface of the face plate of the glass bulb.

6. A cathode ray tube according to claim [1] *10*, wherein the color selection mechanism is formed of a frame and a plurality of *fine* metal [fine] leads extended over the frame and the pitch of *apertures between* said fine metal leads is gradually widened toward a peripheral area in a horizontal direction of the face plate.

7. A cathode ray tube comprising:

a glass bulb *having a skirt portion* in which both an external surface and an internal surface of an effective display area of a face plate are substantially flat and the face plate in the effective display area is substantially uniform in thickness; and a color selection mechanism having a curvature projected toward the face plate provided opposed to an internal surface of the face plate within the glass bulb.

8. A cathode ray tube according to claim 7, wherein a multiple layered resin film is bonded to the external surface of the face plate of the glass bulb.

9. A cathode ray tube according to claim 7, wherein the color selection mechanism is formed of a frame and a plurality of *fine* metal [fine] leads extended over the frame and the pitch of *apertures between* said fine metal leads is gradually widened toward a peripheral area in a horizontal direction of the face plate.

*10. A cathode ray tube comprising:*

*a glass bulb in which an external surface of an effective display area of a face plate is substantially flat and an internal surface of the effective display area of the face plate has a recessed curvature; and*

*a color selection mask having a curvature projected toward the face plate provided opposed to the internal surface of the face plate within said glass bulb, said projected curvature of the color selection mask being larger than the recessed curvature of the internal surface of the face plate.*

*11. A cathode ray tube according to claim 10, wherein said color selection mask has a plurality of apertures with a pitch between adjacent apertures being gradually widened toward a peripheral area in a horizontal direction of the face plate.*

*12. A cathode ray tube comprising:*

*a glass bulb having a skirt portion in which an external surface of an effective display area of a face plate is substantially flat and a thickness of the effective display area of the face plate is substantially uniform; and*

*a color selection mask having a curvature projected toward the face plate provided opposed to an internal surface of the face plate within said glass bulb.*

*13. A cathode ray tube according to claim 12, wherein said color selection mask has a plurality of apertures, and a pitch between adjacent apertures is gradually widened toward a peripheral area in a horizontal direction of the face plate.*

*14. A cathode ray tube comprising:*

*a glass bulb in which an external surface of an effective display area of a face plate is substantially flat and an internal surface of the effective display area of the face plate has a recessed curvature, and a thickness T of a peripheral area in a horizontal direction of the effective display area of the face plate is selected as* $T=1.2T_0$ *to* $1.3T_0$*, where* $T_0$ *is a thickness of a center of the effective display area; and*

*a color selection mask having a curvature projected toward the face plate provided opposed to the internal surface of the face plate within said glass bulb.*

*15. A cathode ray tube according to claim 14, wherein the projected curvature of the color selection mask is larger than the recessed curvature of the internal surface of the face plate.*

*16. A cathode ray tube according to claim 15, wherein said color selection mask has a plurality of apertures, and a pitch between adjacent apertures is gradually widened toward the peripheral area in the horizontal direction of the face plate.*

*17. A glass bulb in which an external surface of an effective display area of a face plate is substantially flat and an internal surface of the effective display area of the face plate has a recessed curvature, and a thickness of a peripheral area in a horizontal direction of the effective display area of the face plate is thicker than that of a center of the effective display area so that the face plate is visually flat by means of the refraction effect; and*

*a color selection mask having a curvature projected toward the face plate provided opposed to the internal surface of the plate within said glass bulb.*

*18. The glass bulb according to claim 17, wherein the projected curvature of the color selection mask is larger than the recessed curvature of the internal surface of the face plate.*

*19. The glass bulb according to claim 18, wherein said color selection mask has a plurality of apertures, and a pitch between adjacent apertures is gradually widened toward the peripheral area in the horizontal direction of the face plate.*

* * * * *